United States Patent
Wu et al.

(10) Patent No.: US 12,144,020 B2
(45) Date of Patent: Nov. 12, 2024

(54) BANDWIDTH PART SWITCHING DUE TO LBT FAILURE

(71) Applicant: Nokia Technologies Oy, Espoo (FI)

(72) Inventors: Chunli Wu, Beijing (CN); Samuli Turtinen, Ii (FI); Benoist Sebire, Tokyo (JP); Claudio Rosa, Randers NV (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 510 days.

(21) Appl. No.: 17/429,878

(22) PCT Filed: Feb. 13, 2019

(86) PCT No.: PCT/CN2019/074992
§ 371 (c)(1),
(2) Date: Aug. 10, 2021

(87) PCT Pub. No.: WO2020/164024
PCT Pub. Date: Aug. 20, 2020

(65) Prior Publication Data
US 2022/0110153 A1    Apr. 7, 2022

(51) Int. Cl.
*H04W 74/02*   (2009.01)
*H04W 72/04*   (2023.01)
(Continued)

(52) U.S. Cl.
CPC ....... *H04W 74/02* (2013.01); *H04W 72/0453* (2013.01); *H04W 74/0808* (2013.01)

(58) Field of Classification Search
CPC ............. H04W 74/02; H04W 72/0453; H04W 74/0808
See application file for complete search history.

(56) References Cited

U.S. PATENT DOCUMENTS

2020/0154446 A1\* 5/2020 Yerramalli .......... H04W 56/001
2020/0154480 A1\* 5/2020 Jose .................. H04W 74/0825
(Continued)

FOREIGN PATENT DOCUMENTS

CN     108476532 A     8/2018
CN     109314972 A     2/2019
(Continued)

OTHER PUBLICATIONS

Office action received for corresponding Vietnamese Patent Application No. 1-2021-05352, dated Aug. 14, 2023, 2 pages of office action and 1 page of translation available.
(Continued)

*Primary Examiner* — Derrick V Rose
(74) *Attorney, Agent, or Firm* — SQUIRE PATTON BOGGS (US) LLP

(57) ABSTRACT

Embodiments of the present disclosure relate to a device, a method, an apparatus and a computer readable storage medium for bandwidth part (BWP) switching. In example embodiments, a method is provided. The method comprises determining, at a terminal device, whether continuous Listen-Before-Talk (LBT) failures occur on a first bandwidth part (BWP), the terminal device operating on the first BWP. The method further comprises in response to the continuous LBT failures occurring on the first BWP, switching to a second BWP different from the first BWP. Instead of triggering a re-establishment procedure once continuous LBT failures are detected, switching to another BWP on different LBT sub-channels can be much more efficient than going through the whole re-establishment and reconfiguration procedures.

16 Claims, 4 Drawing Sheets

(51) Int. Cl.
   *H04W 72/0453*   (2023.01)
   *H04W 74/08*   (2024.01)
   *H04W 74/0808*   (2024.01)

(56) References Cited

U.S. PATENT DOCUMENTS

| | | | | |
|---|---|---|---|---|
| 2021/0409091 | A1* | 12/2021 | Svedman | H04W 72/23 |
| 2022/0022258 | A1* | 1/2022 | Lee | H04L 5/001 |
| 2022/0030623 | A1* | 1/2022 | Wang | H04W 24/08 |
| 2022/0039016 | A1* | 2/2022 | Terry | H04W 52/0235 |
| 2023/0066772 | A1* | 3/2023 | Myung | H04W 74/0816 |

FOREIGN PATENT DOCUMENTS

| | | |
|---|---|---|
| WO | 2018/204884 A1 | 11/2018 |
| WO | 2019/017753 A1 | 1/2019 |

OTHER PUBLICATIONS

Extended European Search Report received for corresponding European Patent Application No. 19914746.3, dated Aug. 11, 2022, 12 pages.

"BWP switching due to LBT", 3GPP TSG-RAN WG2 Meeting #104, R2-1816265, Agenda: 11.2.1.2, OPPO, Nov. 12-16, 2018, 4 pages.

"High Level Views on NR-U BWP", 3GPP TSG RAN WG1 Meeting 91, R1-1720475, Agenda: 7.8, Sony, Nov. 27-Dec. 2, 2017, pp. 1-4.

"Channel access procedure for NR-U", 3GPP TSG RAN WG1 Ad-Hoc Meeting 1901, R1-1900606, Agenda: 7.2.2.2.1, LG Electronics, Jan. 21-25, 2019, 11 pages.

"UL BWP switching upon RACH for NR-U", 3GPP TSG-RAN WG2 Meeting #103, R2-1811066, Agenda: 11.2.1.2, OPPO, Aug. 20-24, 2018, 2 pages.

Office action received for corresponding Chinese Patent Application No. 201980091959.1, dated Aug. 12, 2022, 9 pages of office action and no page of translation available.

"Considerations on BWP switching and multi-activation for NR-U", 3GPP TSG-RAN WG2 Meeting #103bis, R2-1815251, Agenda: 11.2.1.2, CMCC, Oct. 8-12, 2018, 3 pages.

Office action received for corresponding Vietnam Patent Application No. 1-2021-05352, dated Sep. 30, 2021, 1 page of office action and 1 page of translation available.

"Revised SID on NR-based Access to Unlicensed Spectrum", 3GPP TSG RAN Meeting #80, RP-181339, Agenda: 9.4.3, Qualcomm Incorporated, Jun. 11-14, 2018, 5 pages.

"New WID on NR-based Access to Unlicensed Spectrum", 3GPP TG RAN Meeting #82, RP-182878, Agenda: 9.1.1, Qualcomm Inc, Dec. 10-13, 2018, 8 pages.

"On the impact of LBT on RA and SR procedures", 3GPP TSG-RAN WG2 Meeting #103bis, R2-1814293, Agenda: 11.2.1.2, Nokia, Oct. 8-12, 2018, 3 pages.

"SR transmission and procedure for NR-U", 3GPP TSG-RAN WG2 Meeting #103bis, R2-1813585, Agenda: 11.2.1.2, OPPO, Oct. 8-12, 2018, pp. 1-3.

"Handling systematic LBT failures in Random Access", 3GPP TSG-RAN WG2 Meeting #104, R2-1816684, Agenda: 11.2.1.1, MediaTek Inc, Nov. 12-16, 2018, 4 pages.

"Handling LBT failures", 3GPP TSG-RAN WG2 #104, R2-1817969, Agenda: 11.2.2.2, Ericsson, Nov. 12-16, 2018, 3 pages.

"Text Proposal for Scheduling Request in NR-U", 3GPP TSG-RAN WG2 Meeting #104, R2-1816775, Agenda: 11.2.1.2, InterDigital, Nov. 12-16, 2018, pp. 1-2.

"On indicating LBT failure for NR-U", 3GPP TSG-RAN WG2#104, R2-1817934, Agenda: 11.2.2.2, Samsung, Nov. 12-16, 2018, 1 page.

"3rd Generation Partnership Project; Technical Specification Group Radio Access Network; NR; Medium Access Control (MAC) protocol specification (Release 15)", 3GPP TS 38.321, V15.4.0, Dec. 2018, pp. 1-77.

"3rd Generation Partnership Project; Technical Specification Group Radio Access Network; NR; Radio Resource Control (RRC) protocol specification (Release 15)", 3GPP TS 38.331, V15.3.0, Sep. 2018, pp. 1-445.

International Search Report and Written Opinion received for corresponding Patent Cooperation Treaty Application No. PCT/CN2019/074992, dated Nov. 20, 2019, 9 pages.

"Considerations on BWP switching and multi-activation for NR-U", 3GPP TSG-RAN WG2 Meeting #104, R2-1818129, Agenda: 11.2.1.2, CMCC, Nov. 12-16, 2018, 3 pages.

Office Action received for corresponding Indian Patent Application No. 202147038297, dated Mar. 22, 2022, 6 Pages.

Office action received for corresponding Indonesian Patent Application No. P00202106446, dated Nov. 21, 2023, 3 pages of office action and 3 pages of translation available.

* cited by examiner

BANDWIDTH PART SWITCHING DUE TO LBT FAILURE

RELATED APPLICATION

This application was originally filed as PCT Application No. PCT/CN2019/074992 on Feb. 13, 2019, each of which is incorporated herein by reference in its entirety.

TECHNICAL FIELD

Embodiments of the present disclosure generally relate to the field of communications, and in particular, to a device, a method, an apparatus and a computer readable storage media for bandwidth part (BWP) switching.

BACKGROUND

For New Radio (NR) access on licensed spectrum, a scheduling request (SR) failure (that is, a maximum number of SRs are transmitted but no grant can be received) always triggers a random access (RA) procedure. If there is no resource for the RA procedure on a current active BWP, the terminal device may automatically switch to an initial BWP and perform the RA procedure there. If the RA procedure fails, a Radio Link Failure (RLF) will be triggered.

For NR access on unlicensed spectrum (NR-U), a LBT procedure needs to be performed by the terminal device prior to any uplink (UL) transmission. Some solutions consider a systematic UL LBT failure as a trigger for the UL RLF. However, the LBT procedure is performed with a 20 MHz sub-channel, while a NR cell supports a very wide bandwidth, for example, up to 400 MHz. A LBT failure on a certain sub-channel may not necessarily indicate that the cell is non-operable and thus a RLF needs to be triggered.

SUMMARY

In general, example embodiments of the present disclosure provide a device, a method, an apparatus and a computer readable storage medium for BWP switching.

In a first aspect, there is provided a device comprising at least one processor and at least one memory including computer program code. The at least one memory and the computer program code are configured to, with the at least one processor, cause the device at least to: determine, at a terminal device, whether continuous Listen-Before-Talk (LBT) failures occur on a first bandwidth part (BWP), the terminal device operating on the first BWP; and in response to the continuous LBT failure occurring on the first BWP, switch to a second BWP different from the first BWP.

In some embodiments, the at least one memory and the computer program codes are configured to, with the at least one processor, cause the device to: in response to the continuous LBT failures occurring on the first BWP, determine the second BWP to be switched to; and operate on the determined second BWP.

In some embodiments, the first BWP comprises a first set of LBT sub-channels, and the at least one memory and the computer program codes are configured to, with the at least one processor, cause the device to: determine the second BWP comprising a second set of LBT sub-channels, such that at least one of the second set of LBT sub-channels is absent in the first set of LBT sub-channels.

In some embodiments, the at least one memory and the computer program codes are configured to, with the at least one processor, cause the device to determine a plurality of BWPs each configured with at least one of the following: a resource for performing a scheduling request (SR) procedure, and a resource for performing a random access procedure; and select one of the plurality of BWPs as the second BWP.

In some embodiments, the plurality of BWPs comprise a third BWP configured with a resource for performing a Contention Free Random Access (CFRA) procedure, and the at least one memory and the computer program codes are configured to, with the at least one processor, cause the device to: select the third BWP as the second BWP.

In some embodiments, the at least one memory and the computer program codes are configured to, with the at least one processor, cause the device to: receive, from a network device serving the terminal device, a configuration on the second BWP to be switched to; and determine the second BWP based on the configuration.

In some embodiments, the at least one memory and the computer program codes are configured to, with the at least one processor, cause the device to: in response to the continuous LBT failures occurring during an SR procedure, determine a fourth BWP configured with a resource for performing a SR procedure as the second BWP; and initiate a SR procedure on the second BWP with the resource.

In some embodiments, the at least one memory and the computer program codes are configured to, with the at least one processor, cause the device to: in response to the continuous LBT failures occurring during an SR procedure, determine a fifth BWP configured with a resource for performing a random access procedure as the second BWP; and initiate a random access procedure on the second BWP with the resource.

In some embodiments, the at least one memory and the computer program codes are configured to, with the at least one processor, cause the device to: in response to the continuous LBT failures occurring during a Physical Uplink Shared Channel (PUSCH) transmission, determine a sixth BWP configured with a resource for performing a random access procedure as the second BWP; and initiate a random access procedure on the second BWP with the resource.

In some embodiments, the at least one memory and the computer program codes are configured to, with the at least one processor, cause the device to: transmit, to a network device serving the terminal device, an indication on the random access procedure triggered by the continuous LBT failures.

In some embodiments, the at least one memory and the computer program codes are configured to, with the at least one processor, cause the device to: transmit the indication via a Media Access Control (MAC) control element.

In some embodiments, the at least one memory and the computer program codes are configured to, with the at least one processor, cause the device to: determine the number of BWP switches due to continuous LBT failures; and in response to the number of BWP switches exceeding a threshold number, indicate a Radio Link Failure (RLF).

In some embodiments, the at least one memory and the computer program codes are configured to, with the at least one processor, cause the device to: determine if continuous LBT failures occur on each of the plurality of BWPs; and in response to continuous LBT failures occurring on each of the plurality of BWPs, indicate a RLF.

In a second aspect, there is provided a method. The method comprises determining, at a terminal device, whether continuous Listen-Before-Talk (LBT) failures occur on a first bandwidth part (BWP), the terminal device operating on the first BWP. The method further comprises in response to the continuous LBT failure occurring on the first BWP, switching to a second BWP different from the first BWP.

In some embodiments, switching to the second BWP comprises: in response to the continuous LBT failures occurring on the first BWP, determining the second BWP to be switched to; and operating on the determined second BWP.

In some embodiments, the first BWP comprises a first set of LBT sub-channels, and determining the second BWP comprises: determining the second BWP comprising a second set of LBT sub-channels, such that at least one of the second set of LBT sub-channels is absent in the first set of LBT sub-channels.

In some embodiments, determining the second BWP comprises determining a plurality of BWPs each configured with at least one of the following: a resource for performing a scheduling request (SR) procedure, and a resource for performing a random access procedure; and selecting one of the plurality of BWPs as the second BWP.

In some embodiments, the plurality of BWPs comprise a third BWP configured with a resource for performing a Contention Free Random Access (CFRA) procedure, and selecting one of the plurality of BWPs as the second BWP comprises: selecting the third BWP as the second BWP.

In some embodiments, determining the second BWP comprises: receiving, from a network device serving the terminal device, a configuration on the second BWP to be switched to; and determining the second BWP based on the configuration.

In some embodiments, determining the second BWP comprises: in response to the continuous LBT failures occurring during an SR procedure, determining a fourth BWP configured with a resource for performing a SR procedure as the second BWP; and operating on the second BWP comprises: initiating a SR procedure on the second BWP with the resource.

In some embodiments, determining the second BWP comprises: in response to the continuous LBT failures occurring during an SR procedure, determining a fifth BWP configured with a resource for performing a random access procedure as the second BWP; and operating on the second BWP comprises: initiating a random access procedure on the second BWP with the resource.

In some embodiments, determining the second BWP comprises: in response to the continuous LBT failures occurring during a Physical Uplink Shared Channel (PUSCH) transmission, determining a sixth BWP configured with a resource for performing a random access procedure as the second BWP; and operating on the second BWP comprises: initiating a random access procedure on the second BWP with the resource.

In some embodiments, the method further comprises: transmitting, to a network device serving the terminal device, an indication on the random access procedure triggered by the continuous LBT failures.

In some embodiments, transmitting the indication comprises: transmitting the indication via a Media Access Control (MAC) control element.

In some embodiments, the method further comprises: determining the number of BWP switches due to continuous LBT failures; and in response to the number of BWP switches exceeding a threshold number, indicating a Radio Link Failure (RLF).

In some embodiments, the method further comprises: determining if continuous LBT failures occur on each of the plurality of BWPs; and in response to continuous LBT failures occurring on each of the plurality of BWPs, indicating a RLF.

In a third aspect, there is provided an apparatus comprising means to perform the method according to the second aspect.

In a fourth aspect, there is provided a computer readable storage medium that stores a computer program thereon. The computer program, when executed by a processor of a device, causes the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
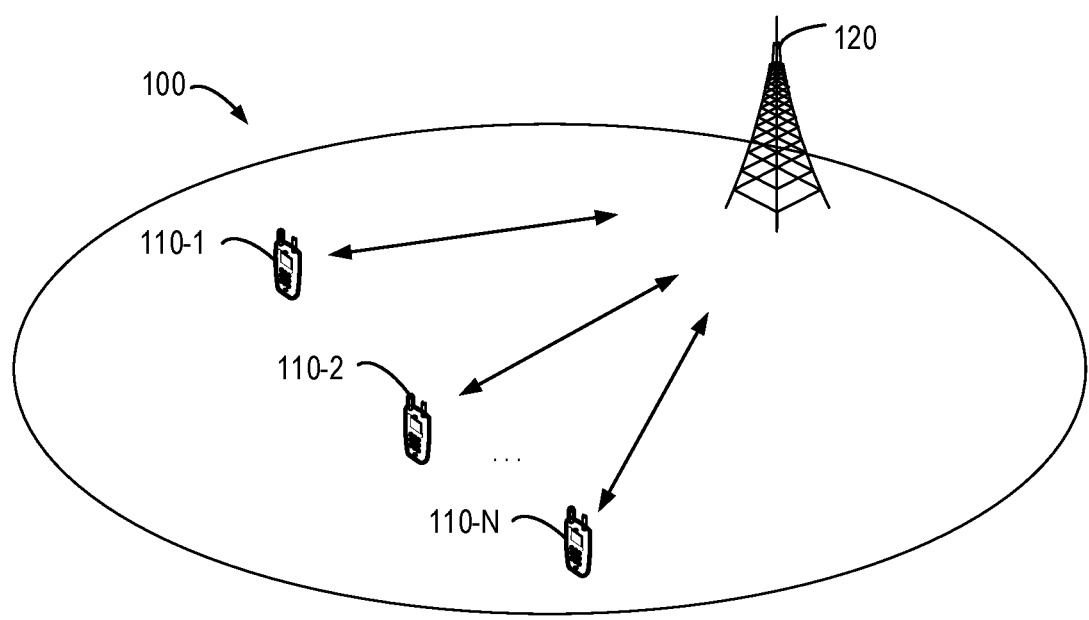
FIG. 1 illustrates a schematic diagram of a communication system according to embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to any suitable device at a network side of a communication network. The network device may include any suitable device in an access network of the communication network, for example, including a node B (NodeB or NB), an evolved NodeB (eNodeB or eNB), a New Radio (NR) NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IOT) scenario, a terminal device may represent a machine or other device that performs monitoring and/or measurement, and transmits the results of such monitoring and/or measurements to another terminal device and/or network device. The terminal device may in this case be a machine-to-machine (M2M) device, which may in a 3GPP context be referred to as a machine-type communication (MTC) device. As one particular example, the terminal device may be a UE implementing the 3GPP Narrow Band Internet of Things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As described above, for NR access on licensed spectrum, a SR failure (that is, no grant is received after a maximum number of SR transmissions) may always trigger a RA procedure. If there is no resource for the RA procedure on a current active BWP, the terminal device may automatically switch to an initial BWP and perform the RA procedure there. If the RA procedure fails, a RLF will be indicated.

For NR access on unlicensed spectrum, a LBT procedure needs to be performed by the terminal device prior to any UL transmission. Some solutions consider a systematic UL LBT failure as a trigger for the UL RLF. However, the LBT procedure is performed with a 20 MHz sub-channel, while a NR cell supports a very wide bandwidth, for example, up to 400 MHz. A LBT failure on a certain sub-channel may not necessarily indicate that the cell is non-operable and thus a RLF needs to be triggered.

Embodiments of the present disclosure provide a scheme for BWP switching, so as to at least in part solve the above and other potential problems. According to embodiments of the present disclosure, if continuous LBT failures occur on the current active BWP, instead of triggering a RLF, the terminal device may switch to a different BWP. If a RA procedure is triggered on the different BWP, the network device may be informed. As such, the communication efficiency can be greatly improved.

FIG. 1 shows an example communication network 100 in which implementations of the present disclosure can be implemented. The communication network 100 includes a network device 120 and terminal devices 110-1, 110-2 ... and 110-N, which can be collectively referred to as "terminal device(s)" 110. The network 100 can provide one or more cells 102 to serve the terminal device 110. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Radio access on both licensed spectrum and unlicensed spectrum are allowed in the environment 100. For example, the terminal device 110 may perform UL transmissions on unlicensed spectrum, such as SR, random access (RA) preamble and/or PUSCH transmissions. For radio access on unlicensed spectrum, the terminal device 110 may perform a LBT procedure prior to any UL transmission. In some cases, the LBT procedure may fail due to collisions and thus a LBT failure occurs. If continuous LBT failures occur on the current active BWP, it may indicate that the current BWP is overloaded.

Figure 2:
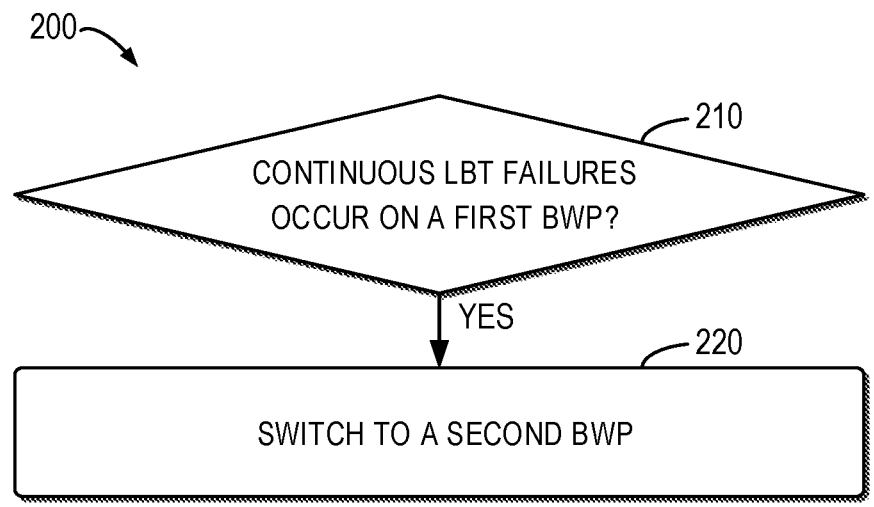
FIG. 2 illustrates a flowchart of an example method according to embodiments of the present disclosure.

FIG. 2 illustrates a flowchart of a method 200 in accordance with embodiments of the present disclosure. The method 200 may be implemented at the terminal device 110 in the communication network 100. It is to be understood that method 200 may further include additional blocks not shown and/or omit some shown blocks, and the scope of the present disclosure is not limited in this regard.

At block 210, the terminal device 110 determines whether continuous LBT failures occur on a first BWP (that is, the current active BWP). For example, the terminal device 110 is operating on the first BWP.

In some embodiments, either a counter or a timer can be used by the terminal device 110 to detect continuous LBT failures on the first BWP. For example, the terminal device 110 may use a counter to count the number of LBT failures occurring continuously. If a LBT procedure succeeds, the terminal device 110 may reset the counter. If the number of LBT failures occurring continuously exceeds a threshold number (which may be predefined, or configured by the network device 120), the terminal device 110 may determine that continuous LBT failures occur. Alternatively, the terminal device 110 may use a timer to detect continuous LBT failures. If a LBT procedure succeeds, the terminal device 110 may reset the timer. If the timer expires (for example, the expiration time may be predefined, or configured by the network device 120), the terminal device 110 may determine that continuous LBT failures occur. In some embodiments, within the first BWP, there may be multiple configured resources overlapping in time domain on different LBT sub-channels (such as, for SR, RA preamble, PUSCH transmissions, etc.). The terminal device 110 may perform a LBT procedure on each of the multiple resources. Only if all of the LBT procedures fail it is considered as one LBT failure.

In some embodiments, a global counter or timer can be used by the terminal device 110 to detect continuous LBT failures during any of SR, RA preamble and/or PUSCH transmissions to trigger BWP switching, regardless of the UL channel of the transmission. Alternatively, in some embodiments, the counter or timer used for detecting continuous LBT failures during an SR transmission may be different from that used for a RA preamble transmission or a PUSCH transmission on a configured UL grant. In some embodiments, within the first BWP, there may be multiple resources configured for SR, RA preamble, PUSCH transmissions and so on. Each of the multiple resources may be associated with a respective counter or timer for detecting continuous LBT failures on the resource.

Alternatively, or in addition, in some embodiments, in response to a beam failure being detected on the first BWP and a beam failure recovery (BFR) procedure being triggered, the terminal device 110 may determine that continuous beam failures occur on the first BWP, since the beam failure on the first BWP may be probably caused by continuous LBT failures as well.

At block 220, in response to the continuous LBT failures occurring on the first BWP, the terminal device 110 switches to a second BWP different from the first BWP. In some embodiments, in response to the continuous LBT failures occurring on the first BWP, the terminal device 110 may determine the second BWP to be switched to and then switch to the second BWP.

In some embodiments, in response to a beam failure being detected on the first BWP and a BFR procedure being triggered, the terminal device 110 may select a BWP configured with a resource for performing a RA procedure (also referred to as "RACH resource") as the second BWP to be switched to. The terminal device 110 may switch to the second BWP and initiate a RA procedure there, since the network device 120 may be unable to switch the BWP due to the beam failure. Alternatively, or in addition, in some embodiments, it may be explicitly configured to the terminal device 110 whether to initiate the RA procedure on the first or second BWP for BFR.

In some embodiments, the first BWP may comprise a first set of LBT sub-channels. In some embodiments, the terminal device 110 may determine the second BWP comprising a second set of LBT sub-channels, such that at least one of the second set of LBT sub-channels is absent in the first set of LBT sub-channels. That is, the first BWP and the second BWP may be on different LBT sub-channels, or the second BWP may include at least one additional LBT sub-channel.

In some embodiments, the terminal device 110 may determine a plurality of BWPs each configured with at least one of the following: a resource for performing a scheduling request (SR) procedure (also referred to as "SR resource"), and a RACH resource. The terminal device 110 may select one of the plurality of BWPs as the second BWP to be switched to.

In some embodiments, if a plurality of BWPs are available (for example, each of which comprises different LBT sub-channels from the first BWP and is configured with a SR resource and/or a RACH resource), the terminal device 110 may prioritize a BWP configured with a resource for performing a Contention Free Random Access (CFRA) procedure (also referred to as "CFRA resource"). Alternatively, in other embodiments, if a plurality of BWPs are available, the terminal device 110 may prioritize a BWP configured with a SR resource.

In some embodiments, the terminal device 110 may select a third BWP configured with a CFRA resource as the second BWP to be switched to. In addition, in case that a RA procedure is triggered on the second BWP due to the continuous LBT failures, as will be described below, the CFRA resource can be used for performing the RA procedure. In some embodiments, the CFRA resource may be allocated for beam failure recovery (BFR). The terminal device 110 may use the CFRA resource allocated for BFR to perform the RA procedure on the second BWP.

In some embodiments, the terminal device 110 may receive, from the network device 120, a configuration on the second BWP to be switched to. In this event, the terminal device 110 may determine, based on the received configuration, the second BWP to be switch to.

In some embodiments, if the continuous LBT failures occur during an SR procedure, the terminal device 110 may determine a BWP (also referred to as "fifth BWP") configured with a random access channel (RACH) resource as the second BWP and initiate a RA procedure on the second BWP, regardless of RACH resources being available on the first BWP. This is because triggering a RA procedure on the same BWP as the SR may likely fail as well if they are associated with a same LBT sub-channel. Alternatively, in some embodiments, if the continuous LBT failures occur during an SR procedure, the terminal device 110 may determine a BWP (also referred to as "fourth BWP") configured with a SR resource as the second BWP and continue the SR procedure on the second BWP.

In some embodiments, if the continuous LBT failures occur during a PUSCH transmission on a configured UL grant, the terminal device 110 may determine a BWP (also referred to as "sixth BWP") configured with a RACH resource as the second BWP and initiate a RA procedure on the second BWP. By means of the RA procedure, the network device 120 can identify that the terminal device 110 has switched to the second BWP and can serve the terminal device 110 on the second BWP.

Alternatively, or in addition, in some embodiments, if a RA procedure is triggered on the second BWP by the continuous LBT failures, the terminal device 110 may transmit an indication on the RA procedure triggered by the continuous LBT failures to the network device 120, so as to inform the network device 120 that the first BWP is overloaded. In some embodiments, the indication may be transmitted via a Media Access Control (MAC) control element (CE). In addition, the indication may further indicate some additional information. The additional information may include but not limited to which of the LBT sub-channel within the first BWP is overloaded, and/or failures of which channel (such as, SR, PUSCH, physical uplink control channel (PUCCH), or the like) triggered the BWP switching.

The LBT sub-channels within the first BWP can be indexed based on the bandwidth of the cell or the bandwidth of the first BWP.

Alternatively, or in addition, in some embodiments, when switching to the second BWP, the terminal device 110 may reset the counter or timer that is used to detect continuous LBT failures. The terminal device 110 may determine if continuous LBT failures are detected on each of the plurality of BWPs configured with respective RACH or SR resources. Only if continuous LBT failures are detected on each of the plurality of BWPs, the terminal device 110 may indicate a RLF, which means the cell is non-operable.

Alternatively, in some embodiments, the terminal device 110 may determine the number of BWP switches due to continuous LBT failures. If the number of BWP switches exceeds a threshold number (for example, which may be configured by the network device 120 via higher layer signaling), the terminal device 110 may indicate a RLF, without initiating a RA procedure or an SR procedure on an additional BWP. Specifically, in some embodiment, a separate counter or timer commonly maintained for all the BWPs may be used to trigger the RLF, which is different from the counter or timer used for detecting continuous LBT failures and triggering BWP switching. For example, FIG. 3 shows an example in this regards.

Figure 3:
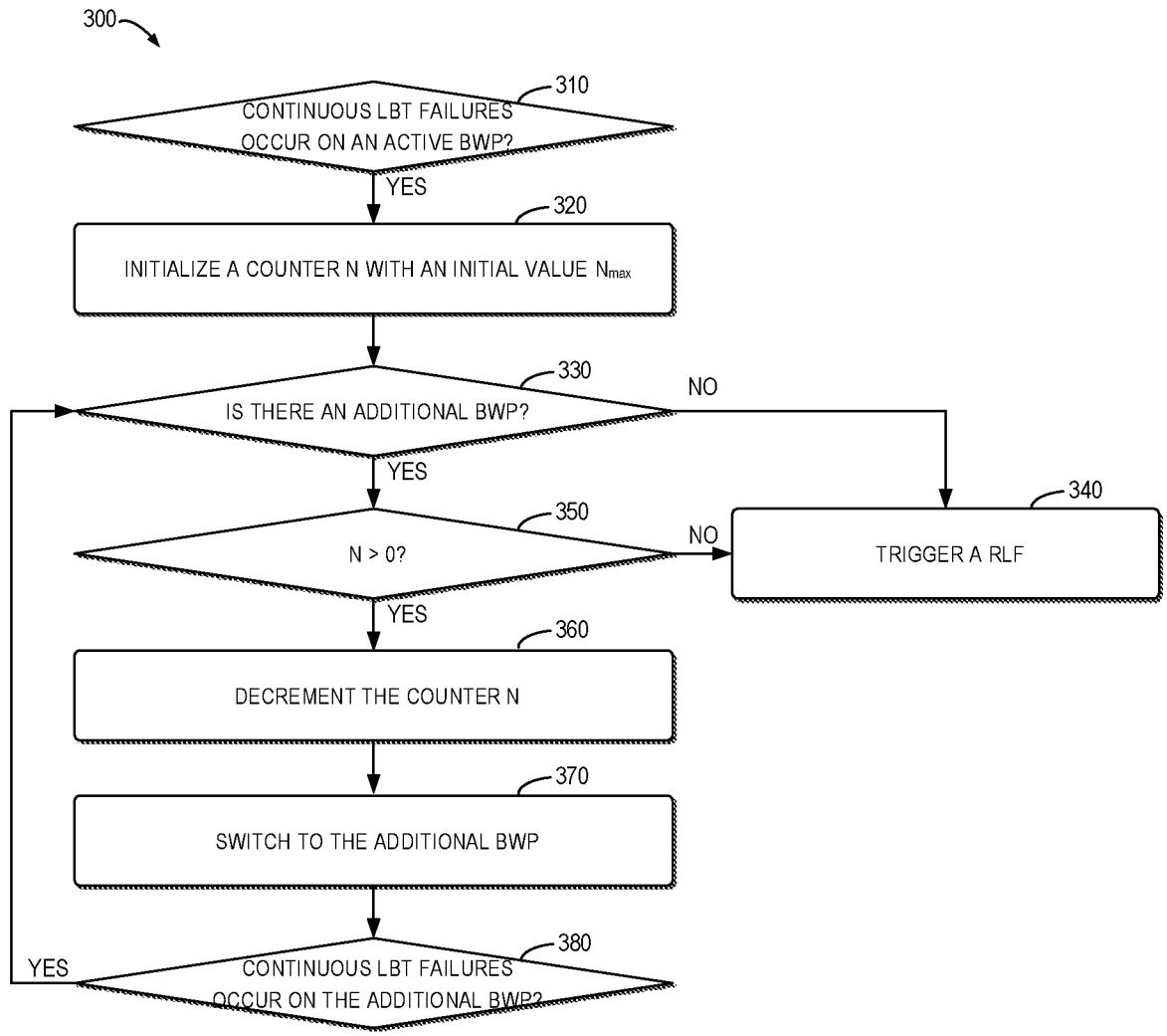
FIG. 3 illustrates a flowchart of an example method according to embodiments of the present disclosure.

FIG. 3 illustrates a flowchart of an example method 300 in accordance with embodiments of the present disclosure. The method 300 may be implemented at the terminal device 110 in the communication network 100. It is to be understood that method 300 may further include additional blocks not shown and/or omit some shown blocks, and the scope of the present disclosure is not limited in this regard.

At block 310, the terminal device 110 determines if continuous LBT failures are detected on an active BWP. In response to continuous LBT failures occurring on the active BWP, at block 320, the terminal device 110 initializes a counter N with an initial value $N_{max}$ (where $N_{max}>0$) which is configured by the network device 110. For example, the counter N may be used to trigger a RLF.

At block 330, the terminal device 110 determines if there is an additional BWP configured with RACH or SR resources. If there is no such BWP, at block 340, the terminal device 110 triggers a RLF. If there is such an additional BWP, at block 350, the terminal device 110 may further determine if the counter N exceeds 0. If the counter N reaches 0, the method 300 proceeds to block 340, where a RLF is triggered. If the counter N is greater than 0, at block 360, the terminal device 110 decrements the count N. Then, at block 370, the terminal device 110 switches to the additional BWP and initiates a RA procedure or an SR procedure on the additional BWP.

At block 380, the terminal device 110 determines if continuous LBT failures are also detected on the additional BWP. In response to continuous LBT failures also occurring on the additional BWP, the method 300 proceeds to block 330.

It can be seen from the above that, embodiments of the present disclosure provide a scheme for BWP switching. According to embodiments of the present disclosure, if continuous LBT failures occur on the current active BWP, instead of triggering a RLF, the terminal device may switch to a different BWP on different LBT sub-channels or additional LBT sub-channel(s). Considering that the system BW of NR-U is much wider than a LBT sub-channel and continuous LBT fails only occur on configured resources (for example, for SR, RA preamble, PUSCH transmissions and so on), instead of triggering a re-establishment procedure once continuous LBT failures are detected, switching to another BWP on different LBT sub-channels can be much more efficient than going through the whole re-establishment and reconfiguration procedures.

In some embodiments, an apparatus capable of performing the method 200 and/or 300 may comprise means for performing the respective steps of the method 200 and/or 300. The means may be implemented in any suitable form. For example, the means may be implemented in a circuitry or software module.

In some embodiments, the means comprises at least one processor; and at least one memory including computer program code, the at least one memory and computer program code configured to, with the at least one processor, cause the performance of the apparatus.

In some embodiments, the apparatus capable of performing the method 200 and/or 300 comprises: means for determining, at a terminal device, whether continuous Listen-Before-Talk (LBT) failures occur on a first bandwidth part (BWP), the terminal device operating on the first BWP; and means for in response to the continuous LBT failure occurring on the first BWP, switching to a second BWP different from the first BWP.

In some embodiments, the means for switching to the second BWP comprises: means for in response to the continuous LBT failure occurring on the first BWP, determining the second BWP to be switched to; and means for operating on the determined second BWP.

In some embodiments, the first BWP comprises a first set of LBT sub-channels, and the means for determining the second BWP comprises: means for determining the second BWP comprising a second set of LBT sub-channels, such that at least one of the second set of LBT sub-channels is absent in the first set of LBT sub-channels.

In some embodiments, the means for determining the second BWP comprises: means for determining a plurality of BWPs each configured with at least one of the following: a resource for performing a scheduling request (SR) procedure, and a resource for performing a random access procedure; and means for selecting one of the plurality of BWPs as the second BWP.

In some embodiments, the plurality of BWPs comprise a third BWP configured with a resource for performing a Contention Free Random Access (CFRA) procedure, and the means for selecting one of the plurality of BWPs as the second BWP comprises: means for selecting the third BWP as the second BWP.

In some embodiments, the means for determining the second BWP comprises: means for receiving, from a network device serving the terminal device, a configuration on the second BWP to be switched to; and means for determining the second BWP based on the configuration.

In some embodiments, the means for determining the second BWP comprises means for in response to the continuous LBT failures occurring during an SR procedure, determining a fourth BWP configured with a resource for performing a SR procedure as the second BWP. The means for operating on the second BWP comprises means for initiating a SR procedure on the second BWP with the resource.

In some embodiments, the means for determining the second BWP comprises means for in response to the continuous LBT failures occurring during an SR procedure, determining a fifth BWP configured with a resource for performing a random access procedure as the second BWP. The means for operating on the second BWP comprises means for initiating a random access procedure on the second BWP with the resource.

In some embodiments, the means for determining the second BWP comprises means for in response to the continuous LBT failures occurring during a Physical Uplink Shared Channel (PUSCH) transmission, determining a sixth BWP configured with a resource for performing a random access procedure as the second BWP. The means for operating on the second BWP comprises means for initiating a random access procedure on the second BWP with the resource.

In some embodiments, the apparatus capable of performing the method 200 and/or 300 further comprises: means for transmitting, to a network device serving the terminal device, an indication on the random access procedure triggered by the continuous LBT failure. In some embodiments, the indication is transmitted via a MAC CE.

In some embodiments, the apparatus capable of performing the method 200 and/or 300 further comprises: means for determining the number of BWP switches due to continuous LBT failures; and means for in response to the number of BWP switches exceeding a threshold number, indicating a Radio Link Failure (RLF).

In some embodiments, the apparatus capable of performing the method 200 and/or 300 further comprises: means for determining if continuous LBT failures occur on each of the plurality of BWPs; and means for in response to continuous LBT failures occurring on each of the BWPs, indicating a Radio Link Failure (RLF).

Figure 4:
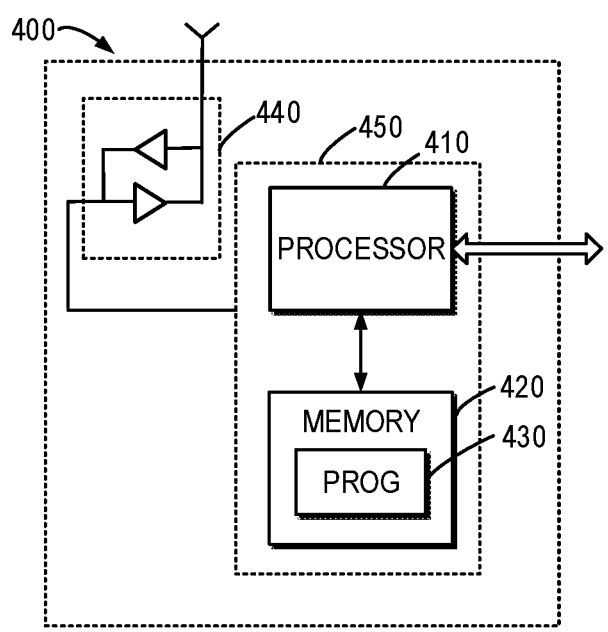
FIG. 4 is a simplified block diagram of a device that is suitable for implementing embodiments of the present disclosure.

FIG. 4 is a simplified block diagram of a device 400 that is suitable for implementing embodiments of the present disclosure. The device 400 may be used to implement the terminal device 110 or the network device 120 as shown in FIG. 1.

As shown, the device 400 includes a processor 410, a memory 420 coupled to the processor 410, a suitable transmitter (TX) and receiver (RX) 440 coupled to the processor 410, and a communication interface coupled to the TX/RX 440. The memory 420 stores at least a part of a program 430. The TX/RX 440 is for bidirectional communications. The TX/RX 440 has at least one antenna to facilitate communication, though in practice an Access Node mentioned in this application may have several ones. The communication interface may represent any interface that is necessary for communication with other network elements.

The program 430 is assumed to include program instructions that, when executed by the associated processor 410, enable the device 400 to operate in accordance with the implementations of the present disclosure, as discussed herein with reference to FIGS. 1 to 3. The implementations herein may be implemented by computer software executable by the processor 410 of the device 400, or by hardware, or by a combination of software and hardware. The processor 410 may be configured to implement various implementations of the present disclosure. Furthermore, a combination of the processor 410 and memory 420 may form processing means 450 adapted to implement various implementations of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the device 400, there may be several physically distinct memory modules in the device 400. The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2 and/or the method 300 as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

For the purpose of the present disclosure as described herein above, it should be noted that, method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A device comprising:
   at least one processor; and
   at least one memory including computer program codes;
   the at least one memory and the computer program codes are configured to, with the at least one processor, cause the device at least to:
   determine, at a terminal device, whether continuous Listen-Before-Talk (LBT) failures occur on a first bandwidth part (BWP), the terminal device operating on the first BWP; and
   in response to the continuous LBT failures occurring on the first BWP;
   determine a plurality of BWPs each configured with at least one of the following: a resource for performing a scheduling request (SR) procedure, and a resource for performing a random access procedure,
   select a second BWP different from the first BWP to be switched to from among the plurality of BWPs,
   switch to the selected second BWP different from the first BWP, and operate on the determined and selected second BWP.

2. The device of claim 1, wherein the first BWP comprises a first set of LBT sub-channels, and wherein the at least one memory and the computer program codes are configured to, with the at least one processor, cause the device to:
   determine the second BWP comprising a second set of LBT sub-channels, such that at least one of the second set of LBT sub-channels is absent in the first set of LBT sub-channels.

3. The device of claim 1, wherein the plurality of BWPs comprise a third BWP configured with a resource for performing a Contention Free Random Access (CFRA) procedure, and wherein the at least one memory and the computer program codes are configured to, with the at least one processor, cause the device to:
   select the third BWP as the second BWP.

4. The device of claim 1, wherein the at least one memory and the computer program codes are configured to, with the at least one processor, cause the device to:
   receive, from a network device serving the terminal device, a configuration on the second BWP to be switched to; and
   determine the second BWP based on the configuration.

5. The device of claim 1, wherein the at least one memory and the computer program codes are configured to, with the at least one processor, cause the device to:
   in response to the continuous LBT failures occurring during an SR procedure, determine a fourth BWP configured with a resource for performing a SR procedure as the second BWP; and
   initiate a SR procedure on the second BWP with the resource.

6. The device of claim 1, wherein the at least one memory and the computer program codes are configured to, with the at least one processor, cause the device to:
   in response to the continuous LBT failures occurring during an SR procedure, determine a fifth BWP configured with a resource for performing a random access procedure as the second BWP; and
   initiate a random access procedure on the second BWP with the resource.

7. The device of claim 1, wherein the at least one memory and the computer program codes are configured to, with the at least one processor, cause the device to:
   in response to the continuous LBT failures occurring during a Physical Uplink Shared Channel (PUSCH) transmission, determine a sixth BWP configured with a resource for performing a random access procedure as the second BWP; and
   initiate a random access procedure on the second BWP with the resource.

8. The device of claim 6, wherein the at least one memory and the computer program codes are configured to, with the at least one processor, cause the device to:
   transmit, to a network device serving the terminal device, an indication on the random access procedure triggered by the continuous LBT failures.

9. The device of claim 8, wherein the at least one memory and the computer program codes are configured to, with the at least one processor, cause the device to:
   transmit the indication via a Media Access Control (MAC) control element.

10. The device of claim 1, wherein the at least one memory and the computer program codes are configured to, with the at least one processor, cause the device to:
    determine the number of BWP switches due to continuous LBT failures; and in response to the number of BWP switches exceeding a threshold number, indicate a Radio Link Failure (RLF).

11. The device of claim 1, wherein the at least one memory and the computer program codes are configured to, with the at least one processor, cause the device to:
determine if continuous LBT failures occur on each of the plurality of BWPs; and
in response to continuous LBT failures occurring on each of the plurality of BWPs, indicate a RLF.

12. A method comprising:
determining, at a terminal device, whether continuous Listen-Before-Talk (LBT) failures occur on a first bandwidth part (BWP), the terminal device operating on the first BWP; and
in response to the continuous LBT failures occurring on the first BWP:
determining a plurality of BWPs each configured with at least one of the following: a resource for performing a scheduling request (SR) procedure, and a resource for performing a random access procedure,
selecting a second BWP different from the first BWP to be switched to from among the plurality of BWPs,
switching to the selected second BWP different from the first BWP, and
operating on the determined and selected second BWP.

13. The method of claim 12, wherein the first BWP comprises a first set of LBT sub-channels, and wherein determining the second BWP comprises:
determining the second BWP comprising a second set of LBT sub-channels, such that at least one of the second set of LBT sub-channels is absent in the first set of LBT sub-channels.

14. A computer program product comprising a non-transitory computer-readable storage medium comprising program instructions stored thereon, the instructions, when executed by a processor of a device, causing the device to:
determine, at a terminal device, whether continuous Listen-Before-Talk (LBT) failures occur on a first bandwidth part (BWP), the terminal device operating on the first BWP; and
in response to the continuous LBT failures occurring on the first BWP:
determine a plurality of BWPs each configured with at least one of the following: a resource for performing a scheduling request (SR) procedure, and a resource for performing a random access procedure,
select a second BWP different from the first BWP to be switched to from among the plurality of BWPs,
switch to the selected second BWP different from the first BWP, and operate on the determined and selected second BWP.

15. The device of claim 1, wherein the at least one memory and the computer program codes are configured to, with the at least one processor, cause the device, when switching to the second BWP, to reset a counter or timer that is used to detect the continuous LBT failures.

16. The method of claim 12, further comprising, when switching to the second BWP, resetting a counter or timer that is used to detect the continuous LBT failures.

* * * * *